United States Patent
Nguyen et al.

(10) Patent No.: US 11,259,214 B2
(45) Date of Patent: Feb. 22, 2022

(54) GUARANTEED PACKET DELAY BUDGET

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US); Arjun Bharadwaj, Cupertino, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/930,160

(22) Filed: May 12, 2020

(65) Prior Publication Data

US 2020/0367112 A1 Nov. 19, 2020

Related U.S. Application Data

(60) Provisional application No. 62/847,183, filed on May 13, 2019.

(51) Int. Cl.
| | |
|---|---|
| *H04W 28/26* | (2009.01) |
| *H04W 28/02* | (2009.01) |
| *H04W 72/04* | (2009.01) |
| *H04B 17/318* | (2015.01) |
| *H04W 4/02* | (2018.01) |

(52) U.S. Cl.
CPC .......... *H04W 28/26* (2013.01); *H04B 17/318* (2015.01); *H04W 4/023* (2013.01); *H04W 28/0268* (2013.01); *H04W 72/0493* (2013.01)

(58) Field of Classification Search
None
See application file for complete search history.

(56) References Cited

U.S. PATENT DOCUMENTS

| | | | |
|---|---|---|---|
| 2011/0038342 A1* | 2/2011 | Lindskog | H04W 52/286 370/329 |
| 2016/0173199 A1* | 6/2016 | Gupta | H04L 41/0803 398/127 |
| 2018/0020051 A1* | 1/2018 | Ma | H04N 21/23439 |
| 2019/0208441 A1* | 7/2019 | Wang | H04B 17/318 |
| 2019/0289615 A1* | 9/2019 | Lee | H04W 72/1242 |

OTHER PUBLICATIONS

International Search Report and Written Opinion—PCT/US2020/032668—ISAEPO—dated Aug. 21, 2020.
(Continued)

*Primary Examiner* — Christine T Duong
(74) *Attorney, Agent, or Firm* — Harrity & Harrity, LLP (57) ABSTRACT

Various aspects of the present disclosure generally relate to wireless communication. In some aspects, a user equipment (UE) may determine an available resource for a communication based at least in part on a control exclusion parameter. The UE may transmit the communication using the available resource. Numerous other aspects are provided.

30 Claims, 7 Drawing Sheets

(56) References Cited

OTHER PUBLICATIONS

Intel Corporation: "Summary for AI 7.2.4.2.2 Mode-2 Resource Allocation", 3GPP TSG RAN WG1 Meeting #96bis , 3GPP Draft; R1-1905717—Summary of 5G V2X Mode 2 V2, 3rd Generation Partnership Project (3GPP), Mobile Competence Centre; 650, Route Des Lucioles; F-06921 Sophia-Antipolis Cedex; France, vol. RAN WG1, No. Xi 'an, China; Apr. 8, 2019-Apr. 12, 2019, Apr. 9, 2019 (Apr. 9, 2019), 21 Pages, XP051707775, Retrieved from the Internet: URL: http://www.3gpp.org/ftp/tsg%5Fran/WG1%5FRL1/TSGR1%5F96b/Docs/R1%2D1905717%2Ezip [retrieved on Apr. 9, 2019] Aspect 3.2, Aspect 6, Aspect 7.

Qualcomm Incorporated: "Sidelink Resource Allocation Mechanism for NR V2X", 3GPP Draft, 3GPP TSG RAN WG1 Meeting #97, R1-1907271_Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019 May 4, 2019 (May 4, 2019), XP051709294, 16 Pages, Retrieved from the Internet: URL:http://www.3gpp.org/ftp/tsg%5Fran/WG1%5FRL1/TSGR1%5F97/Docs/R1%2D1907271%2Ezip [retrieved May 4, 2019], section 5, section 4.

Qualcomm Incorporated: "Sidelink Resource Allocation Mechanism for NR V2X", 3GPP TSG RAN WG1 #96bis, 3GPP Draft; R1-1905009 Sidelink Resource Allocation Mechanism for NR V2X, 3rd Generation Partnership Project (3GPP), Mobile Competence Centre; 650, Route Des Lucioles; F-06921 Sophia-Antipolis Cedex, vol. RAN WG1, No. Xi 'an, China; Apr. 8, 2019-Apr. 12, 2019, Apr. 7, 2019 (Apr. 7, 2019), 11 Pages, XP051700124, Retrieved from the Internet: URL: http://www.3gpp.org/ftp/Meetings%5F3GPP%5FSYNC/RAN1/Docs/R1%2D1905009%2Ezip [retrieved on Apr. 7, 2019] paragraph [0001], paragraph [0005], paragraph [0006].

* cited by examiner

GUARANTEED PACKET DELAY BUDGET

CROSS-REFERENCE TO RELATED APPLICATION

This Patent Applications claims priority to U.S. Provisional Patent Application No. 62/847,183, filed on May 13, 2019, entitled "GUARANTEED PACKET DELAY BUDGET," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a guaranteed packet delay budget.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining an available resource for a communication based at least in part on a control exclusion parameter, wherein the control exclusion parameter is based at least in part on a remaining delay budget of the communication; and transmitting the communication using the available resource.

In some aspects, a UE for wireless communication may include memory and one or more processors operatively coupled to the memory. The memory and the one or more processors may be configured to determine an available resource for a communication based at least in part on a control exclusion parameter, wherein the control exclusion parameter is based at least in part on a remaining delay budget of the communication; and transmit the communication using the available resource.

In some aspects, a non-transitory computer-readable medium may store one or more instructions for wireless communication. The one or more instructions, when executed by one or more processors of a UE, may cause the one or more processors to: determine an available resource for a communication based at least in part on a control exclusion parameter, wherein the control exclusion parameter is based at least in part on a remaining delay budget of the communication; and transmit the communication using the available resource.

In some aspects, an apparatus for wireless communication may include means for determining an available resource for a communication based at least in part on a control exclusion parameter, wherein the control exclusion parameter is based at least in part on a remaining delay budget of the communication; and means for transmitting the communication using the available resource.

Aspects generally include a method, apparatus, system, computer program product, non-transitory computer-readable medium, user equipment, base station, wireless communication device, and processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
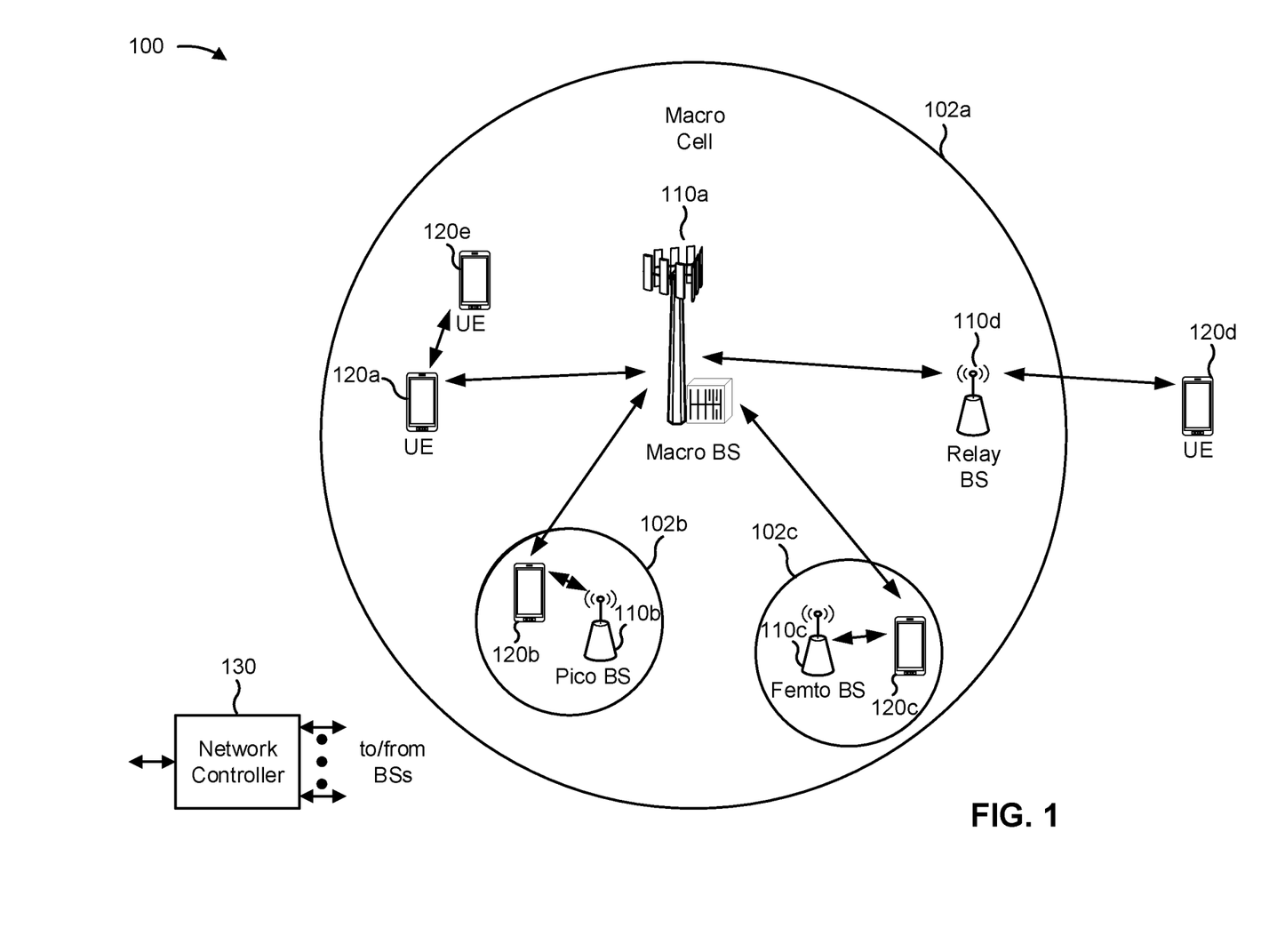
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
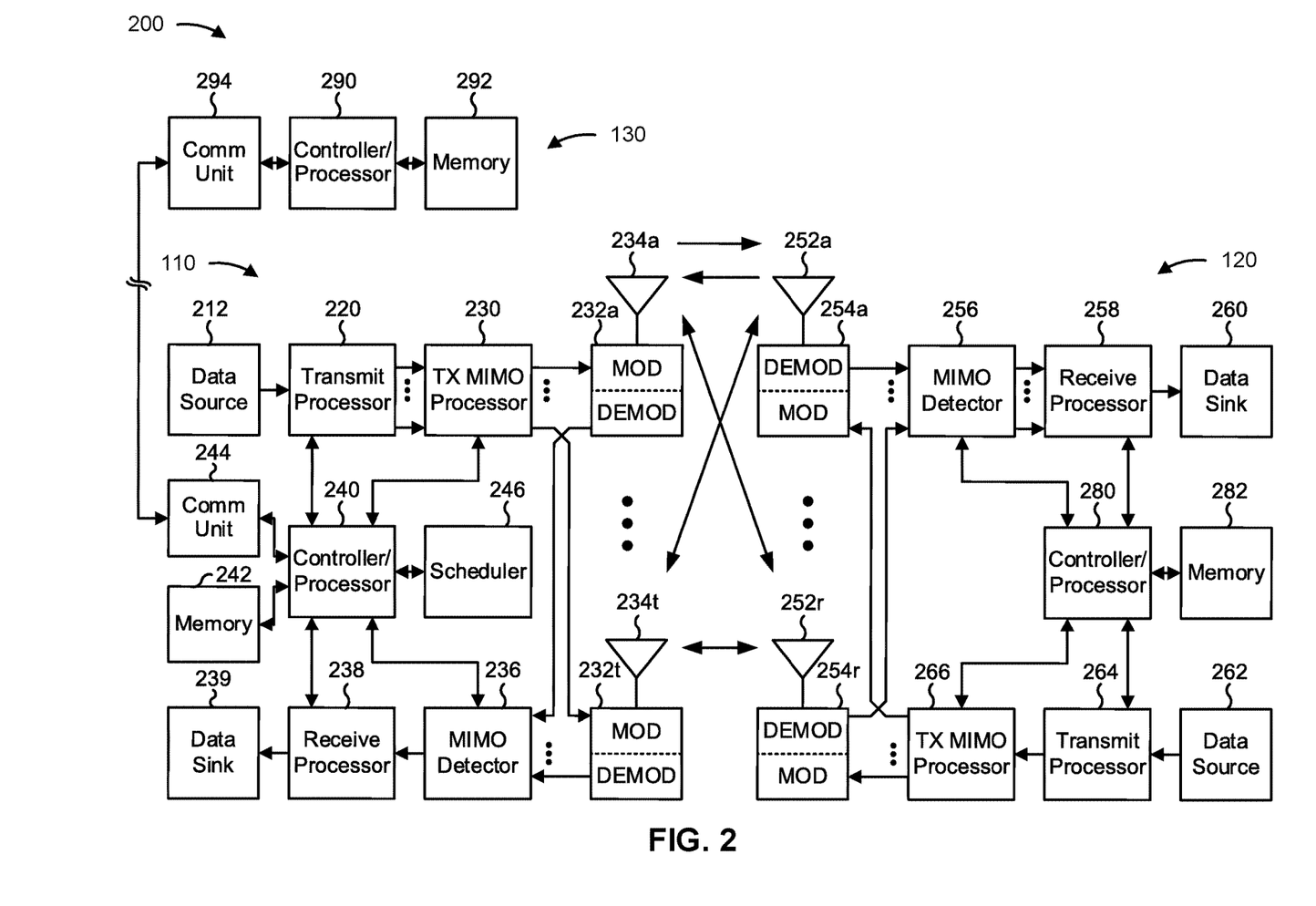
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a guaranteed packet delay budget, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining an available resource for a communication based at least in part on a control exclusion parameter, wherein the control exclusion parameter is based at least in part on a remaining delay budget of the communication; means for transmitting the communication using the available resource; means for transmitting information indicating a reservation for a transmission of the communication in the remaining delay budget; means for determining a plurality of resources in the observation window in accordance with the control exclusion parameter; means for transmitting the communication using the plurality of resources; means for selecting at least one other resource, other than the plurality of resources, for transmission of the communication when one or more resources of the plurality of resources are reserved by another UE; and/or the like. In some aspects, such means may include one or more components of UE 120 described in connection with FIG. 2.

As indicated above, FIG. 2 is provided as an example. Other examples may differ from what is described with regard to FIG. 2.

Figure 3:
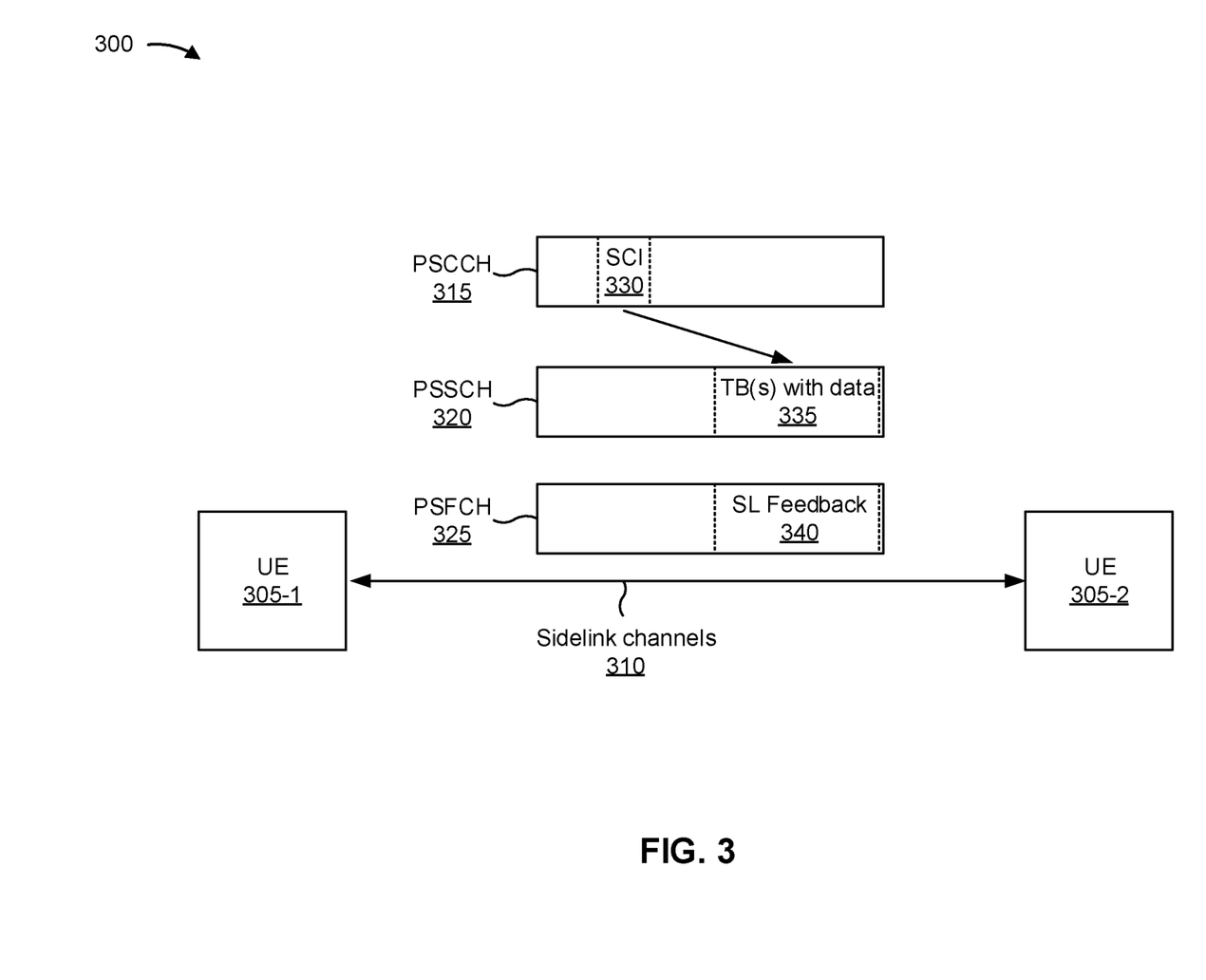
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
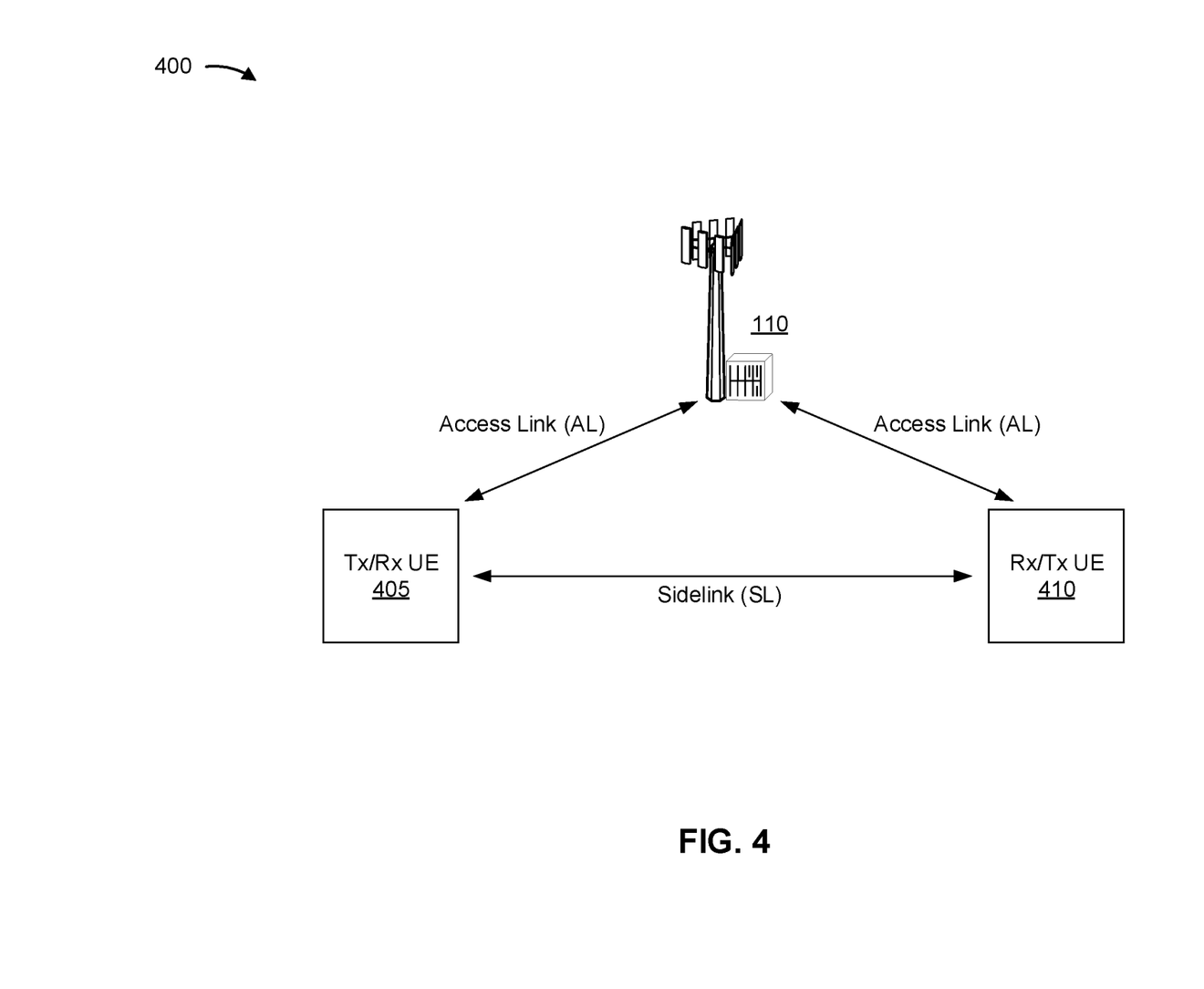
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

A UE may use sidelink communications to communicate with other UEs without the intervention of a centralized scheduling entity. This may be useful in certain types of deployments, such as vehicle-to-anything (V2X) deployments. UEs in a V2X deployment may communicate with each other regarding various actions, scenarios, and/or the like. In many cases, different communications may be associated with different desired ranges, different priority levels, different delay budgets, and/or the like. For example, a signal indicating that a vehicle associated with a UE is to take evasive action may be associated with a high priority level and/or a low delay budget.

In some aspects, a UE may reserve a resource. By reserving a resource, the UE may secure the resource for a future transmission without interference from other UEs. For example, a UE may not transmit in resource reservations based at least in part on a control exclusion (CE) zone. When the UE is within a CE zone of a UE that reserved a resource, the UE may not transmit during the reserved resource. In some aspects, a particular UE may not transmit in reserved resources of other UEs within the particular UE's CE zone. Thus, the CE zone may be used to control resource crowding and congestion.

A delay budget may identify a maximum permissible delay for a communication. In some aspects, a delay budget may pertain to a packet, and may, in this case, be referred to as a packet delay budget (PDB). "Delay budget" is used interchangeably with "packet delay budget" and "PDB" herein. A UE may be required to deliver a communication within the communication's delay budget. Thus, requirements associated with high-priority or low-latency communications may be satisfied. A UE with a large CE zone may have difficulty satisfying a delay budget. For example, as more UEs are included in a UE's CE zone, the UE may be subject to an increasing number of reservations, thereby decreasing the number of opportunities to transmit a communication within a communication's delay budget.

Some techniques and apparatuses described herein provide adjustment of a CE zone of a UE as a function of a remaining delay budget of the communication. For example, the CE zone may decrease in size or inclusiveness in accordance with a CE parameter of the UE as the remaining delay budget approaches zero. Various approaches and relationships between the CE parameter of the UE and the remaining delay budget are described below. By decreasing the size or inclusiveness of the CE zone, the number of UEs whose reservations are effective for the UE may be decreased, thereby increasing likelihood of determining an available resource for the communication.

Figure 5:
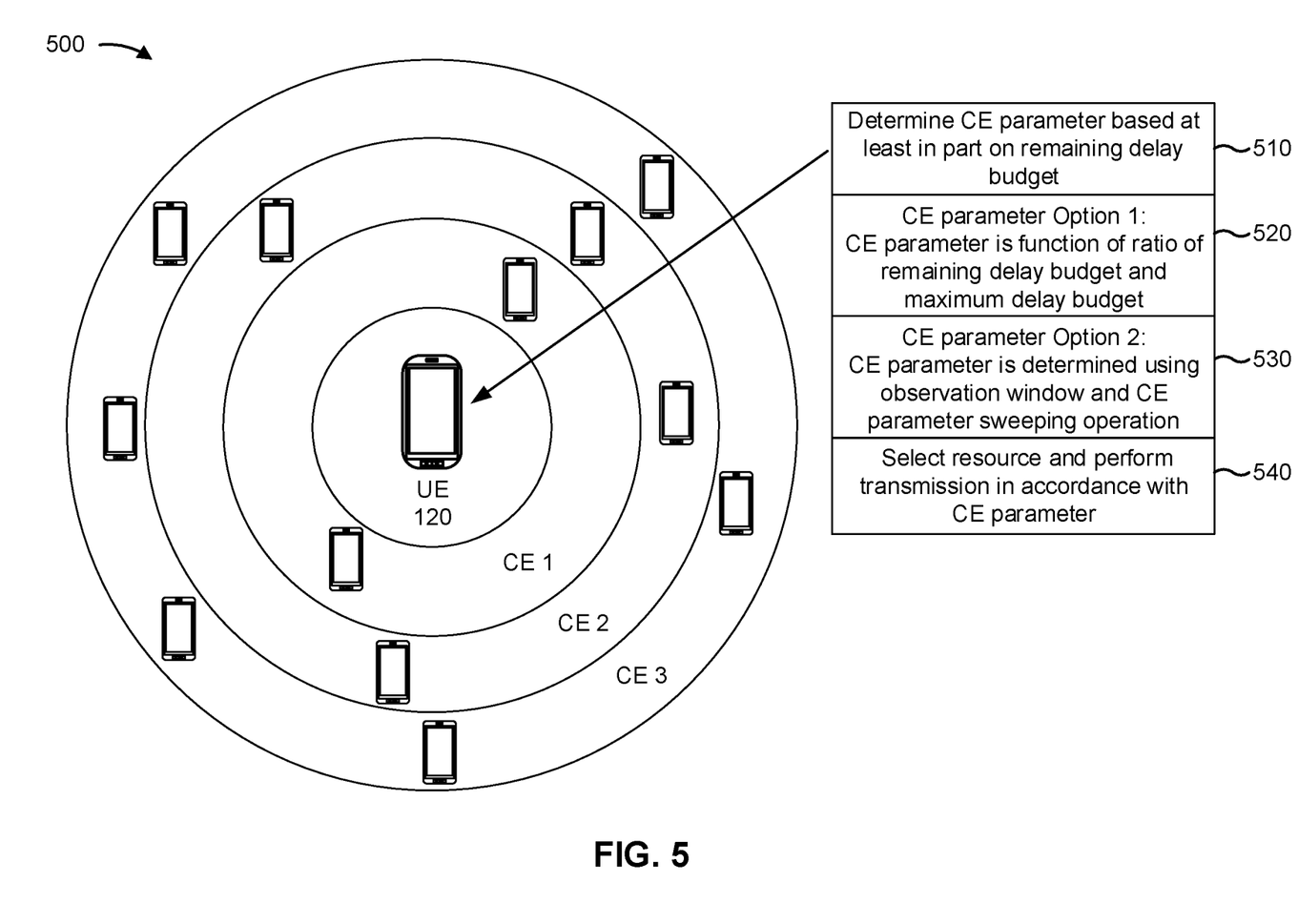
FIG. 5 is a diagram illustrating an example of determination of a control exclusion parameter based at least in part on a remaining packet delay budget, in accordance with various aspects of the present disclosure.

FIG. 5 is a diagram illustrating an example 500 of determination of a control exclusion parameter based at least in part on a remaining packet delay budget, in accordance with various aspects of the present disclosure. As shown, example 500 includes a UE 120 and various recipient devices in CE zones of the UE 120. For example, the UE 120 may be a transmitter device of a communication to be received by the various recipient devices.

As shown by reference number 510, the UE 120 may determine a CE parameter based at least in part on a remaining delay budget. The CE parameter may identify a range for the CE zone in terms of distance or in terms of a threshold power level (e.g., reference signal received power (RSRP and/or the like). The operations described in example 500 are primarily described with the CE parameter in terms of distance, but can be applied when the CE parameter is in terms of power level. As used herein, a reference to a decreasing CE parameter should be understood to indicate that a size or inclusiveness of a corresponding CE zone is decreased (e.g., based at least in part on decreasing the radius of the CE zone or increasing the threshold power level that indicates whether a reservation is effective for the UE 120). The area enclosed by the CE zone when the CE zone is defined in terms of distance may be referred to as an inclusion area.

As further shown, the UE 120 may determine the CE parameter based at least in part on a remaining delay budget. In a first example, the UE 120 may determine the CE parameter as a function of a ratio of a remaining delay budget and a maximum delay budget of a communication (described in more detail in connection with reference number 520). In a second example, the UE 120 may determine the CE parameter using an observation window that uses a set length or a remaining delay budget, as described in more detail in connection with reference number 530. The remaining delay budget for a communication may identify a remaining length of time within which the UE 120 is required to transmit a communication.

As shown by reference number 520, in some aspects (sometimes referred to as Option 1), the UE 120 may determine the CE parameter as a function of a ratio of a remaining delay budget and a maximum delay budget of the communication. For example, the CE parameter may be defined using a function that provides an increasing CE parameter as the remaining delay budget decreases. Thus, as the remaining delay budget approaches zero, the CE parameter may approach zero or another diminished value relative to an un-adjusted CE parameter of the UE 120. This may increase the likelihood of the UE 120 finding an unreserved resource on which to transmit the communication. For illustration, refer to FIG. 5. As the UE 120's CE zone decreases in range (e.g., from CE 3 to CE 2 to CE 1) based at least in part on a decreasing distance threshold or an increasing power threshold, fewer recipient devices are included in the UE 120's CE zone, thereby decreasing the number of reservations with which the UE 120 may contend. Thus, the UE 120 is more likely to find an available resource for communication before the delay budget ends, thereby satisfying the delay budget for the communication.

The function may be any function that provides a decreasing CE parameter or a CE parameter that approaches zero as the remaining delay budget decreases. In some aspects, the function may use a normalized delay budget value (e.g., a ratio of the remaining delay budget to the maximum delay budget). In some aspects, the function may include a power function. For example, where t represents a normalized delay budget value, Max_CE represents the maximum CE parameter of the UE 120, and $f(t)$ represents the adjusted CE parameter of the UE 120, the function may be $f(t)=\text{Max\_CE}^{\wedge}(t)$. In some aspects, the function may be based at least in part on a threshold. For example, using the same variables as above and where the threshold is represented by th (wherein th is between zero and one), the function may be defined as:

$f(t)=\text{Max\_CE}$ if $t>th$, and $f(t)=\text{Max\_CE}^{\wedge}(t/th)$ otherwise.

In some aspects, the function may include a linear function or another type of function.

As shown by reference number 530, in some aspects, the UE 120 may determine the CE parameter using an observation window (e.g., an interval) (referred to as Option 2 herein). For example, the observation window may have a length of N transmission time intervals (TTIs) (wherein N is any integer) or a remaining delay budget of the UE 120, whichever is less. In other words, the observation window may have a length of N TTIs unless there are fewer than N TTIs left in the UE 120's remaining delay budget, and may then have a length corresponding to the length of the remaining delay budget. The observation window may correspond to a current TTI (e.g., slot, subframe, mini-slot, sub-slot, group of slots, group of mini-slots, group of sub-slots, etc.) of the UE 120. In one example, N may correspond to a length of time in the future for which the UE 120 can make a reservation. For example, if reservations are permitted for resources up to 16 TTIs in the future, then N may be equal to 16.

The UE 120 may sweep a group of CE parameters in the observation window. For example, the UE 120 may determine respective ratios of free resources for each CE parameter, of the group of CE parameters, in the observation window. As used herein, a free resource may refer to a resource that does not overlap a reserved resource or that only partially overlaps a reserved resource. The UE 120 may select a CE parameter, of the group of CE parameters, that provides a ratio of free resources that satisfies a threshold. For example, the threshold may be any value between zero and one. As the remaining delay budget decreases, the CE parameter corresponding to the desired ratio of free resources may decrease in proportion to the remaining delay budget, as fewer resources may be expected to be available in a smaller observation window. Option 2 may increase the likelihood of the UE 120 determining a more suitable resource (e.g., a resource on which contention is unlikely) later in the observation window, rather than a less suitable resource (e.g., a resource on which contention is likely) in a current TTI of the UE 120 when using Option 1.

In some aspects, the UE 120 may select a plurality of resources in the observation window. For example, the UE 120 may select a plurality of resources in the observation window in accordance with the CE parameter selected as described above. In this case, when a first resource (e.g., an earliest resource), of the plurality of resources, occurs, the UE 120 may determine whether the first resource is occupied (e.g., whether a contention likelihood on the first resource satisfies a threshold, whether a reservation associated with the first resource is detected within the CE zone of the CE parameter, and/or the like). If the first resource is occupied, the UE 120 may select at least one other resource, other than the plurality of resources, for transmission of the communication, using an updated CE parameter (which may correspond to a smaller CE zone). If the first resource is unoccupied, the UE 120 may transmit the communication using the plurality of resources. In this way, the UE 120 may determine whether the plurality of resources, selected in the observation window in accordance with the CE parameter, is suitable for transmission of the communication, and may selectively use the plurality of resources or different resources accordingly. This may reduce likelihood of collision of the communication.

As shown by reference number 540, the UE 120 may select the resource and perform the transmission in accordance with the CE parameter. For example, the UE 120 may select a resource for transmission of the communication or a reservation associated with the communication. In some aspects, the UE 120 may signal the CE parameter to the recipient devices. For example, the UE 120 may signal an un-adjusted CE parameter or an adjusted CE parameter (e.g., a CE parameter adjusted in accordance with Option 1 or Option 2, above). Thus, the UE 120 may determine a CE parameter that decreases a size of a CE zone as a delay budget of the UE 120 decreases, thereby increasing likelihood that the delay budget is satisfied.

As indicated above, FIG. 5 is provided as an example. Other examples may differ from what is described with respect to FIG. 5.

Figure 6:
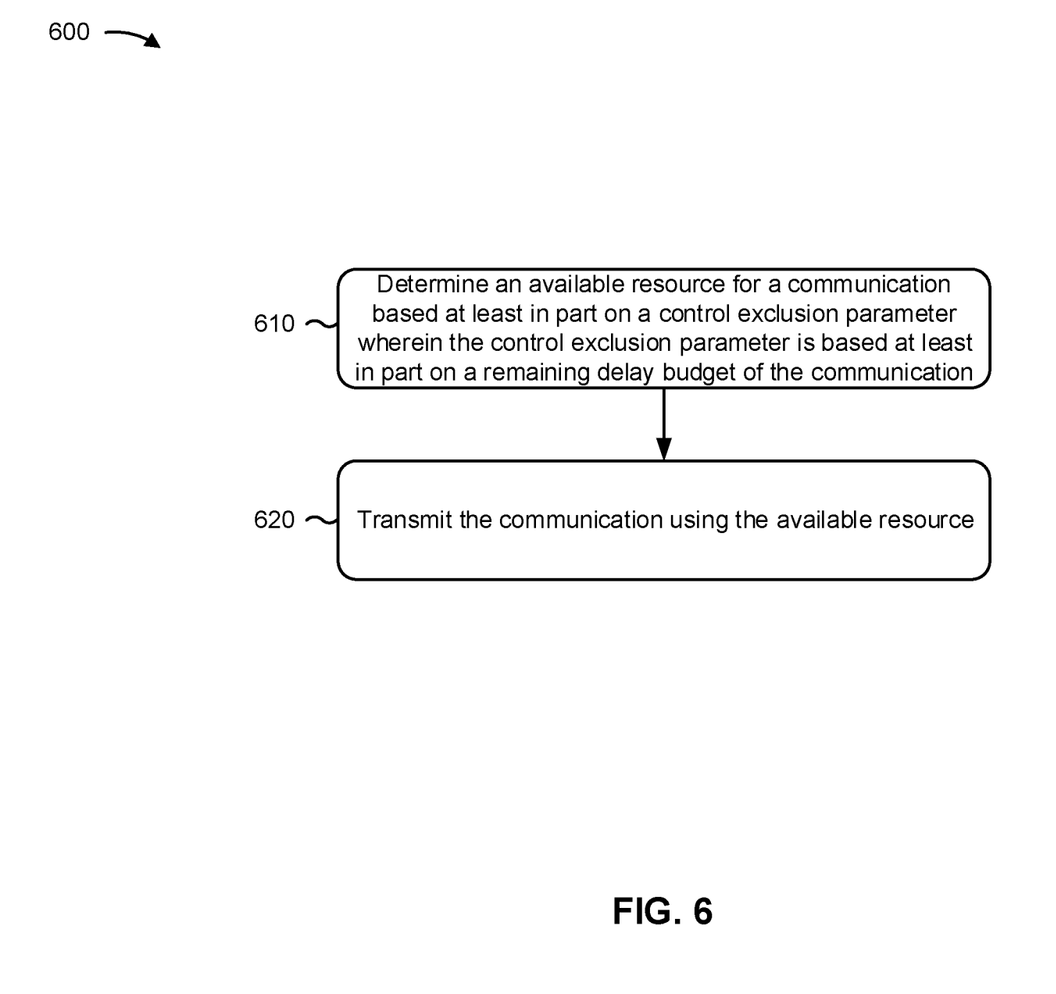
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a UE (e.g., UE 120 and/or the like) performs operations associated with determination of a control exclusion parameter based at least in part on a remaining packet delay budget, in accordance with various aspects of the present disclosure.

As shown in FIG. 6, in some aspects, process 600 may include determining an available resource for a communication based at least in part on a control exclusion parameter wherein the control exclusion parameter is based at least in part on a remaining delay budget of the communication (block 610). For example, the user equipment (e.g., using antenna 252, DEMOD 254, MIMO detector 256, receive processor 258, controller/processor 280, and/or the like) may determine an available resource for a communication based at least in part on a control exclusion parameter, as described above. In some aspects, the control exclusion parameter is based at least in part on a remaining delay budget of the communication.

As further shown in FIG. 6, in some aspects, process 600 may include transmitting the communication using the available resource (block 620). For example, the user equipment (e.g., using controller/processor 280, transmit processor 264, TX MIMO processor 266, MOD 254, antenna 252, and/or the like) may transmit the communication using the available resource, as described above.

Process 600 may include additional aspects, such as any single aspect or any combination of aspects described below and/or in connection with one or more other processes described elsewhere herein.

In a first aspect, the UE may transmit information indicating a reservation for a transmission of the communication in the remaining delay budget.

In a second aspect, alone or in combination with the first aspect, the control exclusion parameter is a function of a ratio between the remaining delay budget and a maximum delay budget of the communication.

In a third aspect, alone or in combination with one or more of the first and second aspects, an inclusion area associated with the control exclusion parameter decreases as the remaining delay budget decreases.

In a fourth aspect, alone or in combination with one or more of the first through third aspects, the communication comprises a reservation for a transmission.

In a fifth aspect, alone or in combination with one or more of the first through fourth aspects, the control exclusion parameter is configured to increase a probability of selecting a resource as the remaining delay budget decreases.

In a sixth aspect, alone or in combination with one or more of the first through fifth aspects, the control exclusion parameter is configured to increase a probability of selecting a resource as the remaining delay budget approaches zero.

In a seventh aspect, alone or in combination with one or more of the first through sixth aspects, the control exclusion parameter is determined based at least in part on an observation window that comprises the remaining delay budget, wherein the control exclusion parameter is selected from a plurality of candidate control exclusion parameters based at least in part on respective ratios of free resources, in the observation window, corresponding to the plurality of candidate control exclusion parameters.

In an eighth aspect, alone or in combination with one or more of the first through seventh aspects, the UE may determine a plurality of resources in the observation window in accordance with the control exclusion parameter; and when a first resource, of the plurality of resources, occurs, selectively transmit the communication using the plurality of resources when all resources, of the plurality of resources, are still available, or reselect at least one other resource, other than the plurality of resources, for transmission of the communication when one or more resources of the plurality of resources is reserved by another UE.

In a ninth aspect, alone or in combination with one or more of the first through eighth aspects, the control exclusion parameter is defined as a distance threshold.

In a tenth aspect, alone or in combination with one or more of the first through ninth aspects, the distance threshold decreases as the remaining delay budget decreases.

In an eleventh aspect, alone or in combination with one or more of the first through tenth aspects, the control exclusion parameter is defined as a reference signal received power (RSRP) threshold.

In a twelfth aspect, alone or in combination with one or more of the first through eleventh aspects, the RSRP threshold increases as the remaining delay budget decreases.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
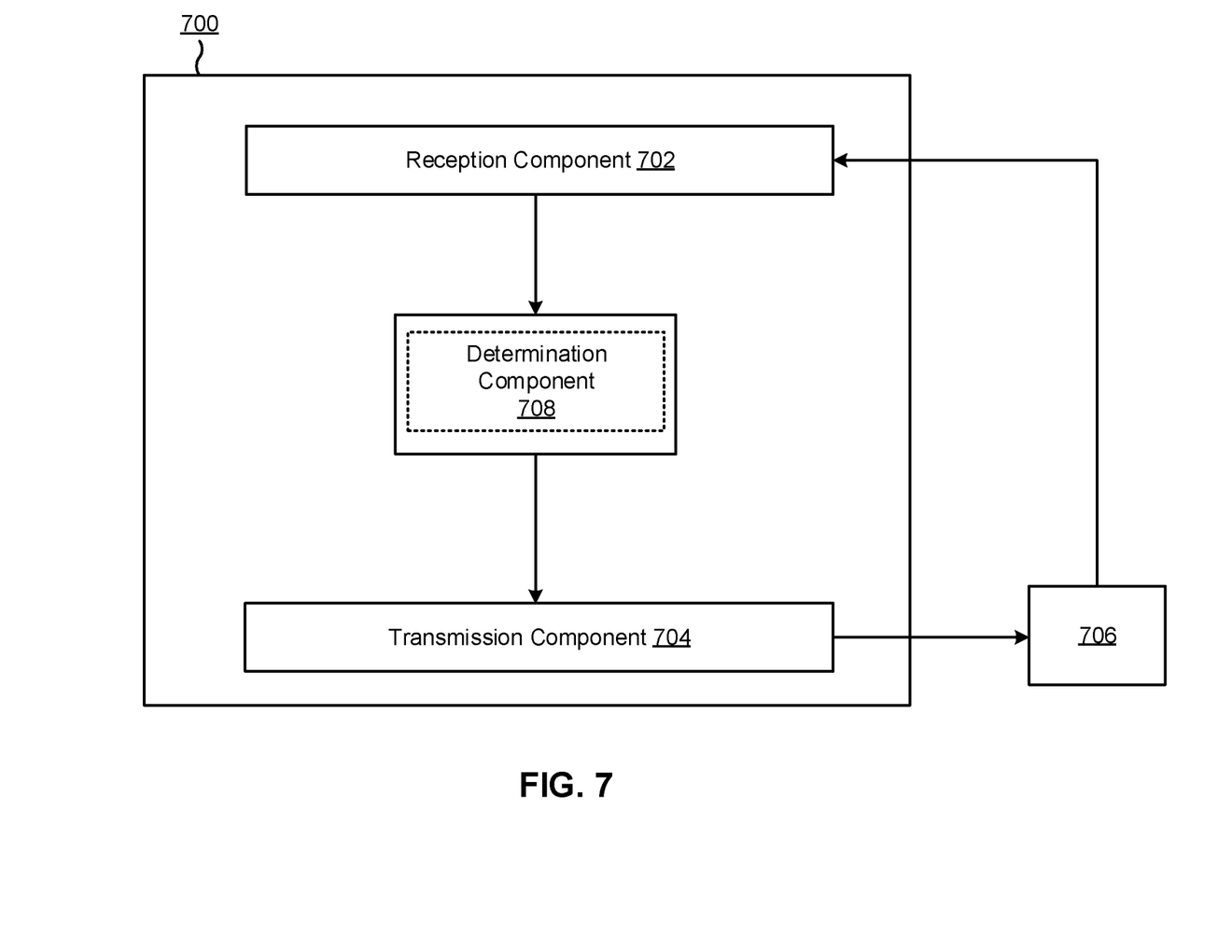
FIG. 7 is a block diagram of an example apparatus for wireless communication.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708.

In some aspects, the apparatus 700 may be configured to perform one or more operations described herein in connection with FIGS. 3-6. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digitalto-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The determination component 708 may determine an available resource for a communication based at least in part on a control exclusion parameter. In some aspects, the determination component 708 may determine a plurality of resources in an observation window in accordance with the control exclusion parameter. In some aspects, the determination component 708 may reselect at least one other resource, other than a plurality of resources, for transmission of the communication when one or more resources of the plurality of resources is reserved by another UE. The transmission component 704 may transmit the communication using the available resource. In some aspects, the transmission component 704 may transmit information indicating a reservation for a transmission of the communication in the remaining delay budget.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying a plurality of resources in an observation window for a communication in accordance with a control exclusion parameter,
       wherein the control exclusion parameter is based at least in part on a remaining delay budget of the communication; and
   when a first resource, of the plurality of resources, occurs, selectively:
       transmitting the communication using the plurality of resources when all resources, of the plurality of resources, are still available, or
       selecting at least one other resource, other than the plurality of resources, for transmission of the communication when one or more resources, of the plurality of resources, are reserved by another UE.

2. The method of claim 1, further comprising:
   transmitting information indicating a reservation for a transmission of the communication in the remaining delay budget.

3. The method of claim 1, wherein the control exclusion parameter is a function of a ratio between the remaining delay budget and a maximum delay budget of the communication.

4. The method of claim 1, wherein an inclusion area associated with the control exclusion parameter decreases as the remaining delay budget decreases.

5. The method of claim 1, wherein the communication comprises a reservation for a transmission.

6. The method of claim 1, wherein the control exclusion parameter is configured to increase a probability of selecting a resource as the remaining delay budget decreases.

7. The method of claim 1, wherein the control exclusion parameter is configured to increase a probability of selecting a resource as the remaining delay budget approaches zero.

8. The method of claim 1, wherein the control exclusion parameter is determined based at least in part on the observation window, and wherein the control exclusion parameter is selected from a plurality of candidate control exclusion parameters based at least in part on respective ratios of free resources, in the observation window, corresponding to the plurality of candidate control exclusion parameters.

9. The method of claim 1, wherein a length of the observation window corresponds to a length of the remaining delay budget.

10. The method of claim 1, wherein the control exclusion parameter is defined as a distance threshold or as a reference signal received power (RSRP) threshold.

11. The method of claim 10, wherein the control exclusion parameter is defined as the distance threshold, and wherein the distance threshold decreases as the remaining delay budget decreases.

12. The method of claim 10, wherein the control exclusion parameter is defined as the RSRP threshold, wherein the RSRP threshold increases as the remaining delay budget decreases.

13. A user equipment (UE) for wireless communication, comprising:
a memory; and
one or more processors coupled to the memory, the memory and the one or more processors configured to:
identify a plurality of resources in an observation window for a communication in accordance with a control exclusion parameter,
wherein the control exclusion parameter is based at least in part on a remaining delay budget of the communication; and
when a first resource, of the plurality of resources, occurs, selectively:
transmit the communication using the plurality of resources when all resources, of the plurality of resources, are still available, or
select at least one other resource, other than the plurality of resources, for transmission of the communication when one or more resources, of the plurality of resources, are reserved by another UE.

14. The UE of claim 13, wherein the one or more processors are configured to:
transmit information indicating a reservation for a transmission of the communication in the remaining delay budget.

15. The UE of claim 13, wherein the control exclusion parameter is a function of a ratio between the remaining delay budget and a maximum delay budget of the communication.

16. The UE of claim 13, wherein an inclusion area associated with the control exclusion parameter decreases as the remaining delay budget decreases.

17. The UE of claim 13, wherein the communication comprises a reservation for a transmission.

18. The UE of claim 13, wherein the control exclusion parameter is configured to increase a probability of selecting a resource as the remaining delay budget decreases.

19. The UE of claim 13, wherein the control exclusion parameter is configured to increase a probability of selecting a resource as the remaining delay budget approaches zero.

20. The UE of claim 13, wherein the control exclusion parameter is determined based at least in part on the observation window, and wherein the control exclusion parameter is selected from a plurality of candidate control exclusion parameters based at least in part on respective ratios of free resources, in the observation window, corresponding to the plurality of candidate control exclusion parameters.

21. The UE of claim 13, wherein a length of the observation window corresponds to a length of the remaining delay budget.

22. The UE of claim 13, wherein the control exclusion parameter is defined as a distance threshold or as a reference signal received power (RSRP) threshold.

23. The UE of claim 22, wherein the control exclusion parameter is defined as the distance threshold, and wherein the distance threshold decreases as the remaining delay budget decreases.

24. The UE of claim 10, wherein the control exclusion parameter is defined as the RSRP threshold, wherein the RSRP threshold increases as the remaining delay budget decreases.

25. A non-transitory computer-readable medium storing one or more instructions for wireless communication, the one or more instructions comprising:
one or more instructions that, when executed by one or more processors of a user equipment (UE), cause the one or more processors to:
identify a plurality of resources in an observation window for a communication in accordance with a control exclusion parameter,
wherein the control exclusion parameter is based at least in part on a remaining delay budget of the communication; and
when a first resource, of the plurality of resources, occurs, selectively:
transmit the communication using the plurality of resources when all resources, of the plurality of resources, are still available; or
select at least one other resource, other than the plurality of resources, for transmission of the communication when one or more resources, of the plurality of resources, are reserved by another UE.

26. The non-transitory computer-readable medium of claim 25, wherein the control exclusion parameter is a function of a ratio between the remaining delay budget and a maximum delay budget of the communication.

27. An apparatus for wireless communication, comprising:
means for identifying a plurality of resources in an observation window for a communication in accordance with a control exclusion parameter,
wherein the control exclusion parameter is based at least in part on a remaining delay budget of the communication; and
means for transmitting the communication using the plurality of resources, when a first resource, of the plurality of resources, occurs and when all resources, of the plurality of resources, are still available, or
means for selecting at least one other resource, other than the plurality of resources, for transmission of the communication when the first resource, of the plurality of resources, occurs and when one or more resources, of the plurality of resources, are reserved by a user equipment.

28. The apparatus of claim 27, wherein the control exclusion parameter is a function of a ratio between the remaining delay budget and a maximum delay budget of the communication.

29. The non-transitory computer-readable medium of claim 25, wherein a length of the observation window corresponds to a length of the remaining delay budget.

30. The apparatus of claim 27, wherein a length of the observation window corresponds to a length of the remaining delay budget.

\* \* \* \* \*